United States Patent

Itoyama et al.

[11] Patent Number: 4,798,875
[45] Date of Patent: Jan. 17, 1989

[54] BIAXIALLY ORIENTED POLYESTER FILM

[75] Inventors: Kuniyoshi Itoyama; Norihiro Horita; Shigemi Seki; Satoyuki Minami, all of Otsu, Japan

[73] Assignee: Toray Industries, Inc., Tokyo, Japan

[21] Appl. No.: 141,340

[22] PCT Filed: Apr. 1, 1986

[86] PCT No.: PCT/JP86/00158
§ 371 Date: Dec. 1, 1987
§ 102(e) Date: Dec. 1, 1987

[87] PCT Pub. No.: WO87/05919
PCT Pub. Date: Oct. 8, 1987

[51] Int. Cl.⁴ .................................... C08L 67/02
[52] U.S. Cl. ................................... 525/444; 428/910
[58] Field of Search ..................... 525/444; 428/910

[56] References Cited

U.S. PATENT DOCUMENTS

| | | | |
|---|---|---|---|
| 4,386,174 | 5/1983 | Cogswell | 525/444 |
| 4,497,865 | 2/1985 | Minami | 428/336 |
| 4,728,698 | 3/1988 | Isayer | 525/444 |

FOREIGN PATENT DOCUMENTS

| | | |
|---|---|---|
| 51-031774 | 3/1976 | Japan . |
| 61-014934 | 1/1986 | Japan . |
| 61-014933 | 1/1986 | Japan . |

*Primary Examiner*—Patricia Short
*Attorney, Agent, or Firm*—Austin R. Miller

[57] ABSTRACT

Disclosed is a biaxially oriented polyester film composed mainly of a polymer blend comprising [A] a polyester having recurring units of the following general formula (I):

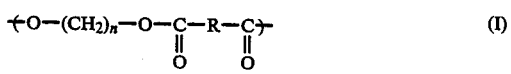

(I)

wherein n is 2, 4 or 6 and R is at least one member selected from the group consisting of

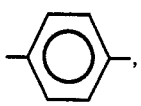

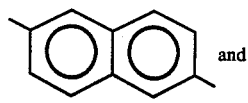 and

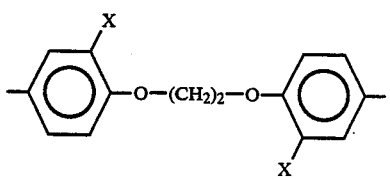

in which X is H or Cl and at least one X is Cl, and [B] a copolyester having units represented by the general formula (I) and units represented by the following general formula (II) and/or the following general formula (III):

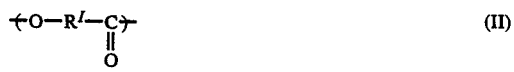

(II)

and/or

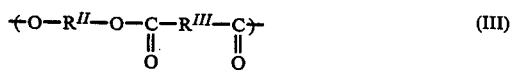 (III)

wherein $R^I$, $R_{II}$ and $R^{III}$ stand for at least one member selected from the group consisting of 1,3-phenylene, 1,4-phenylene, 2,6-naphthalene, 2,7-naphthalene,

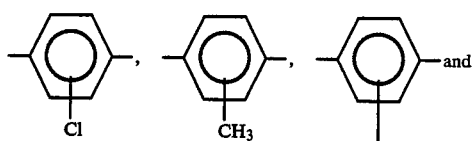

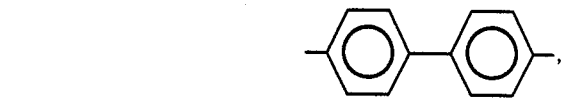

and having a flow-initiating temperature not higher than 350° C. and a melt anisotropy-forming capacity, the molar ratio of the units represented by the general formula (II) and/or the general formula (III) being 0.5 to 18 mole % based on the total polymer blend.

One plane of the crystal of the polyester [A] is plane-oriented in the film surface, the in-plane orientation index is 0.75 to 0.95, and the crystal size in the crystal plane direction is 35 to 75 Å.

11 Claims, No Drawings

BIAXIALLY ORIENTED POLYESTER FILM

TECHNICAL FIELD

The present invention relates to a biaxially oriented polyester film. More particularly, the present invention relates to a biaxially oriented polyester film having an excellent dimensional stability and a high elastic modulus, and suitable for use in the production of magnetic tapes and flexible printed circuit boards.

BACKGROUND ART

A biaxially oriented polyester film is used as the base of a magnetic tape or a flexible printed circuit board.

However, to obtain a labor-saving effect at the processing step in the production of a magnetic tape or a flexible printed circuit board, or with an increase of the height of the application object, the demand for a film having an enhanced elastic modulus and a further improved dimensional stability is increasing. However, although the elastic modulus of a biaxially oriented polyester film is increased by drawing in multiple stages in the film-forming process, the dimensional stability is degraded by this multiple-stage drawing. Attempts to improve the mechanical characteristics of the biaxially drawn polyester film by making the film from a blend of a polymer having a rigid polymer chain, such as an aromatic polyester having a melt anisotropy-forming capacity, with a polymer having a flexible polymer chain have been made. However, the mechanical characteristics are not improved because of an insufficient dispersion of the rigid polymer, and because the rigid polymer peels from the interface of the dispersed phase. Utilization can be made only in a product obtained by drawing a fiber made of a blend of a rigid chain polymer with a polyester to form voids in the interface of the dispersed phase, and thereby mat the film surface.

It is an object of the present invention to provide a polyester film having a high elastic modulus, a low thermal shrinkage and an excellent dimensional stability, in which the defects of the conventional biaxially oriented polyester film are overcome by finely dispersing a polymer having a rigid molecule chain in a polyester.

DISCLOSURE OF THE INVENTION

According to the present invention, this object is attained by providing a biaxially oriented polyester film composed mainly of a polyblend comprising [A] a polyester having recurring units of the following general formula (I):

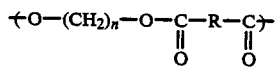    (I)

wherein n is 2, 4 or 6 and R is at least one member selected from the group consisting of

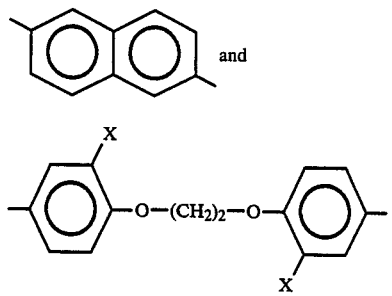

in which X is H or Cl and at least one X is Cl, and [B] a copolyester having units represented by the general formula (I) and units represented by the following general formula (II) and/or the following general formula (III):

    (II)

and/or

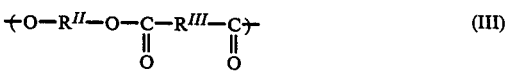    (III)

wherein $R^I$, $R^{II}$ and $R^{III}$ stand for at least one member selected from the group consisting of 1,3-phenylene, 1,4-phenylene, 2,6-naphthalene, 2,7-naphthalene,

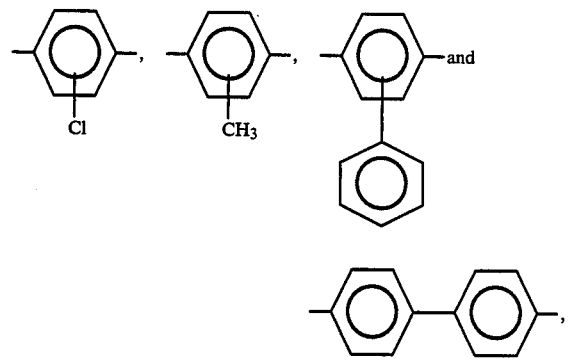

and having a flow-initiating temperature not higher than 350° C. and a melt anisotropy-forming capacity, the molar ratio of the units represented by the general formula (II) and/or the general formula (III) being 0.5 to 18 mole % based on the total polyblend, wherein one plane of the crystal of the polyester [A] is plane-oriented in the film surface, the in-plane orientation index is 0.75 to 0.95, and the crystal size in said crystal plane direction is 35 to 75 Å.

BEST MODE FOR CARRYING OUT THE INVENTION

In the polyester [A] constituting the film of the present invention, which has the recurring units represented by the following general formula (I):

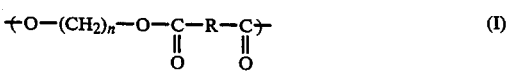    (I)

n is an integer selected from the group consisting of 2, 4 and 6, but in view of the elastic modulus and thermal shrinkage of the film, a polymer in which n is 2 is especially preferred. In the general formula (I), R is selected from the group consisting of 1,4-phenylene, 2,6-naphthalene,

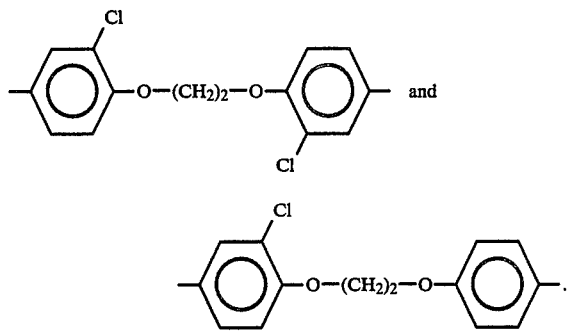

As specific examples of the structural units of the polyester [A], the following units (a) through (e) can be mentioned, but in view of the film characteristics, polymers having structural units (a), (b) or (c) are preferred:

(a)
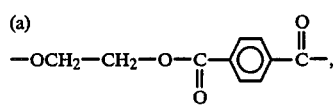

(b)
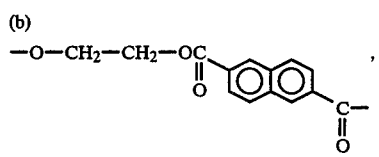

(c)
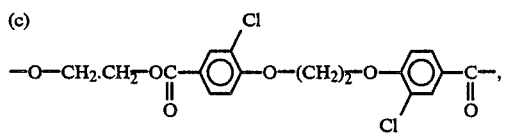

(d)
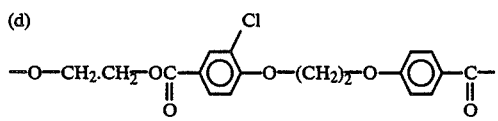

and (e)
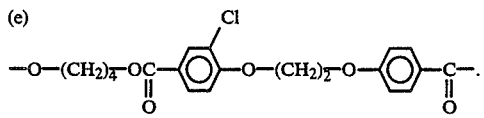

Other components may be copolymerized in the polyester [A], if the amount of the comonomer component is not larger than 5 mole %. As the comonomer component, there can be mentioned dicarboxylic acids such as terephthalic acid, isophthalic acid, 2,7-naphthalenedicarboxylic acid, and α,β-bis(phenoxy)ethane-4,4'-dicarboxylic acid, and dihydroxy compounds such as 1,4-cyclohexanediol and phenylhydroquinone.

The polyester [B] as the other constituent polymer of the film of the present invention comprises flexible units represented by the following general formula (I):

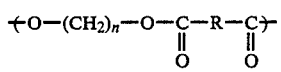 (I)

wherein n is 2, 4 or 6, and R is

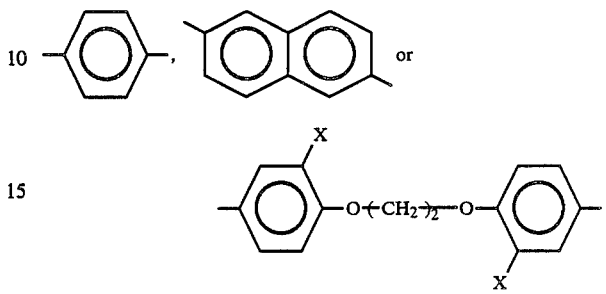

in which X is H or Cl and at least one X is Cl, and rigid units represented by the following general formula (II) and/or the following general formula (III)

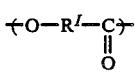 (II)

and/or

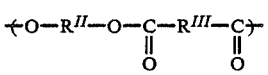 (III)

wherein $R^I$, $R^{II}$ and $R^{III}$ stand for at least one member selected from the group consisting of 1,3-phenylene, 1,4-phenylene, 2,6-naphthalene, 2,7-naphthalene,

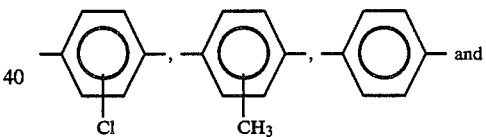

A polyester [B] in which parts of $R^I$, $R^{II}$ and $R^{III}$ stand for at least one member selected from the group consisting of

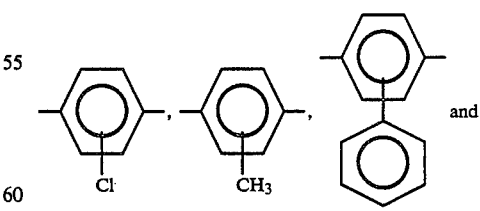

is preferred, because the flow-initiating temperature is lowered.

As specific examples of the rigid units represented by the general formulae (II) and (III), the following units (a) through (o) can be mentioned, and in view of the film characteristics, polymers comprising at least one kind of unit selected from the units (a), (b), (d), (e), (f), (g), (i), (j), (k) and (m) are preferred:

(a) 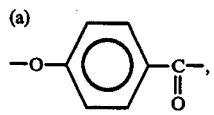

(b) 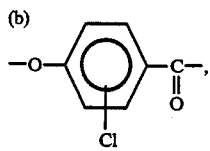

(c) 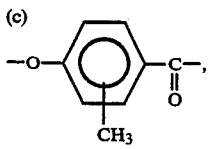

(d) 

(e) 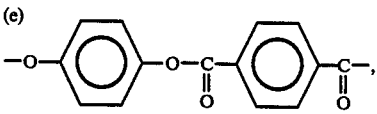

(f) 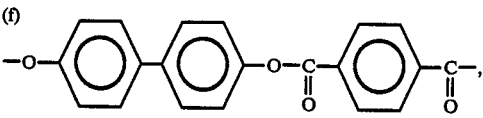

(g) 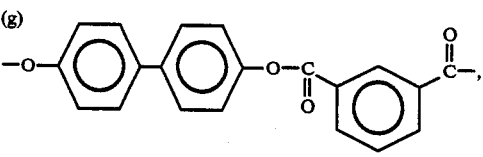

(h) 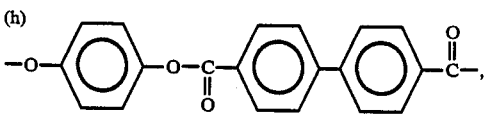

(i) 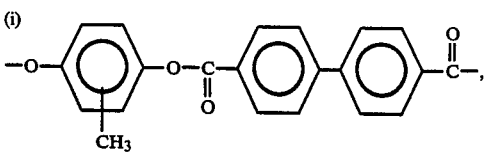

(j) 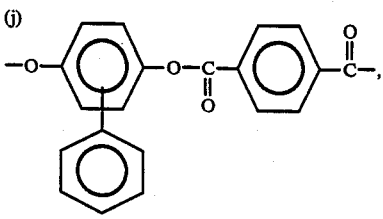

-continued (k) 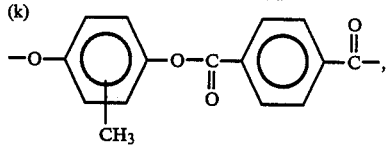

(l) 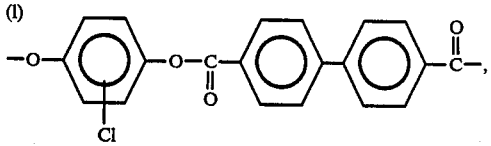

(m) 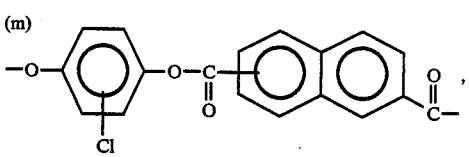

(n) 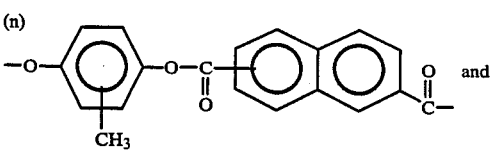 and (o) 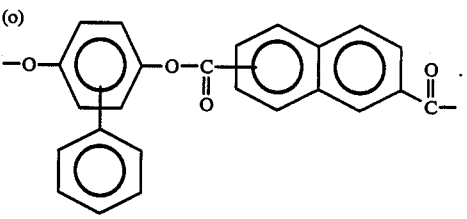

The polyester [B] constituting the film of the present invention is a polyester having a flow-initiating temperature not higher than 350° C. and a melt anisotropy-forming capacity, and this polyester has a chemical structure represented by the following general formula:

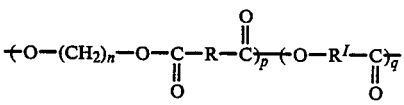

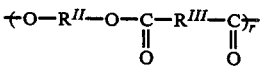

The flow-initiating temperature of this polyester [B] is generally influenced by the sum of the molar ratios of the units represented by the general formulae (II) and (III), that is, (q+r). By the term "flow-initiating temperature" referred to herein is meant a lowest temperature at which the polymer can flow. Where the copolymerization ratio (q+r) is high, the flow-initiating temperature of the copolyester is often in agreement with the melting point of the polymer. When the random degree of the copolymer sequence is increased, a definite melting point cannot be confirmed by the thermal analysis process, but the presence of the temperature at which the polymer begins to flow under heating is observed. In this case, this temperature is defined as the flow-initiating temperature.

Where the polyester [B] having a flow-initiating temperature not higher than 350° C. is used, the film-forming property of the resulting polymer blend is very good and the characteristics of the formed film are greatly improved. If the flow-initiating temperature is lower than 300° C., the film-forming property is especially improved. If the flow-initiating temperature exceeds 350° C., the melt-mixing temperature or the film-forming temperature is elevated, and therefore, thermal decomposition or deterioration of the polymer occurs. The lower limit of the flow-initiating temperature is not particularly critical, but the lower limit of the flow-initiating temperature is preferably 150° C.

The polyester [B] as one constituent polymer of the present invention has a melt anisotropy-forming capacity. In general, a polymer having a melt anisotropy-forming capacity comes to have a liquid crystal structure showing an optical anisotropy when heated at a temperature higher than the flow-initiating temperature. However, even if the polymer does not form a liquid crystal, when the polymer is inserted between two glass sheets and a relatively low shear rate of less than 10 sec$^{-1}$ is imposed on the melt by fixing one glass sheet at a temperature higher than the flow temperature and sliding the other glass sheet, the polymer takes the form of an optically anisotropic liquid showing a flow birefringence. The optical anisotropy of the polymer melt can be observed under crossed prisms by a polarizing microscope provided with a heating stage. Thus, a polymer showing an optical anisotropy in the stationary state or under a shear deformation of less than 10 sec$^{-1}$ when heated at a temperature higher than the flow temperature is defined as a polymer "having a melt anisotropy-forming capacity".

As is seen from the foregoing description, the polyester [B] is characterized in that the polyester [B] has a melt anisotropy-forming capacity and molecules of the polyester [B] are easily arranged and oriented in the stationary or flowing state. In order to retain this characteristic, preferably the sum (q+r) of the mole ratios of the components represented by the general formulae (II) and (III) in the molecule is at least 40 mole %.

Examples of the polyester [B] having a melt anisotropy-forming capacity, to be used for the film of the present invention, which are preferable in view of the characteristics of the film, are as follows.

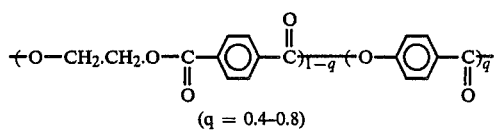

(a)

(q = 0.4–0.8)

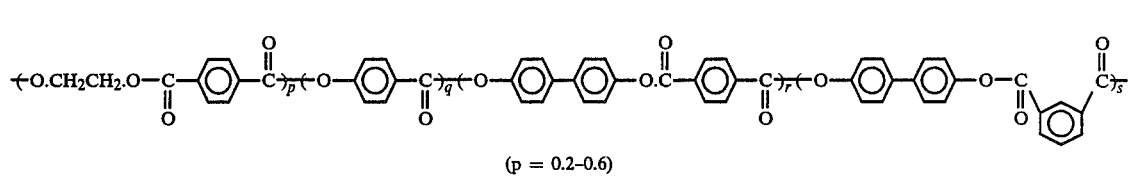

(b)

(p = 0.2–0.6)

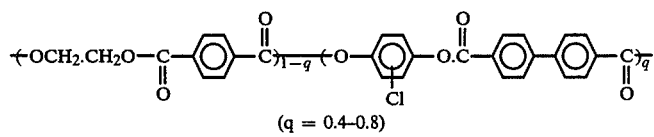

(c)

(q = 0.4–0.8)

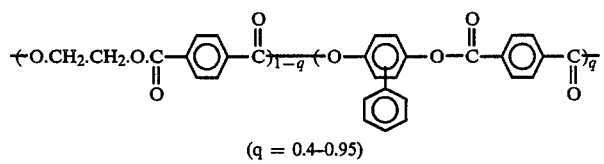

(d)

(q = 0.4–0.95)

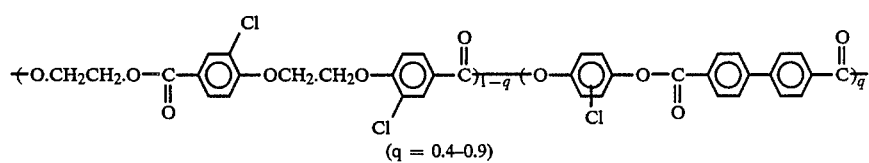

(e)

(q = 0.4–0.9)

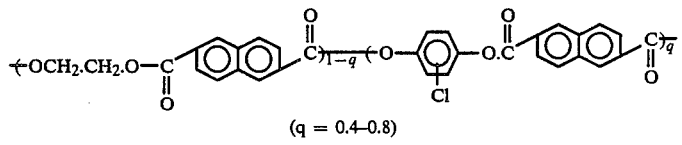

(f)

(q = 0.4–0.8)

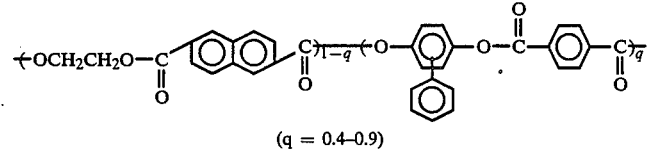

(g)

(q = 0.4–0.9)

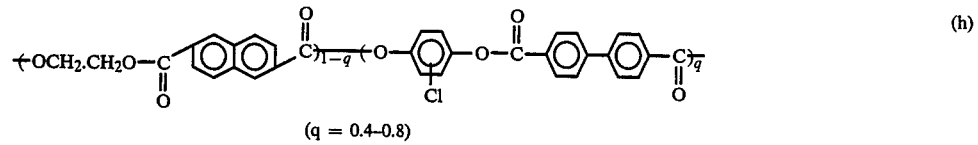

(q = 0.4–0.8)

The copolymerization manner of the components (I), (II) and (III) of the polyester [B] having a melt anisotropy-forming capacity according to the present invention may be either random copolymerization or block copolymerization, but blending of a random copolymer is preferred from the viewpoint of the production of the film because drawing for the biaxial orientation is easily accomplished.

Other component may be copolymerized in the polyester, if the amount of this other component is not larger than 5 mole %. As this other component, there can be mentioned dicarboxylic acids such as terephthalic acid, isophthalic acid, 2,6-naphthalenedicarboxylic acid, α,β-bis(phenoxy)ethane-4,4′-dicarboxylic acid, and 4,4′-diphenylcarboxylic acid, and dihydroxyl compounds such as 1,4-cyclohexanedimethanol and phenylhydroquinone.

The film of the present invention is composed of a blend comprising the base polyester [A] and the polyester [B]. The blending ratio of the polyester [B] is selected so that the molar ratio of the sum of the components represented by the general formulae (II) and (III) is 0.5 to 18 mole % based on the total polyblend.

The molar ratio of the components of the general formulae (II) and (III) preferred from the viewpoint of the film-forming properties and the film characteristics is 1 to 15 mole %, especially 2 to 10 mole %. If the blending ratio calculated as the molar ratio is lower than 0.5 mole %, little or no effect is attained by addition of the polyester [B] having a liquid crystal-forming capacity, and it cannot be deemed that the characteristics are practically improved.

On the other hand, if the blending ratio exceeds 18 mole %, the drawability of the polymer blend is considerably degraded and biaxial drawing is extremely difficult, and such defects as a low elastic modulus and a poor impact resistance appear in the obtained film.

The molar ratio $F_R$ of the sum of the components represented by the general formulae (II) and (III) is the ratio of the mole number X of the rigid units of the total mole number Y of low-molecular-weight compounds obtained by cutting all the ester linkages of the polymer blend, which is defined by the following formula:

$$F_R = 100 \times X/Y$$

Furthermore, X is represented by the formula of $X = N_m + 2X_d$, in which $N_m$ stands for the mole number of the aromatic monohydroxycarboxylic acid and $X_d$ stands for the mole number of the aromatic dihydroxyl compound.

In general, $F_R$ can be determined by hydrolyzing the polymer and quantitatively analyzing the decomposed components by using a gas chromatograph.

The preferred blending ratio $X_b$ (% by weight) adopted when the polyester [B] is blended in the polyester [A] depends on the copolymerization ratio $M_f$ (mole %) of the units of the formula (II) and/or the formula (III) in the polyester [B] and is expressed by the following formula:

$$1 \leq X_b \leq -0.8 M_f + 90$$

The blending ratio (% by weight) is defined by the following formula:

$$X_b = \frac{100 \times \text{(weight of polyester [B])}}{\text{(weight of polyester [B])} + \text{(weight of polyester [A])}}$$

If the copolymerization ratio of the components (II) and (III) in the polyester [B] is increased, the molecule chain becomes rigid and the compatibility with the polyester [A] is changed. Therefore, the upper limit of the preferred blending ratio is reduced.

The polyester [B] having a melt anisotropy-forming capacity is characterized in that, if the polyester [B] is deformed in the molten state, the polymer is elongated and the molecules are easily arranged and oriented. This property is advantageous for improving the film characteristics by controlling the dispersed form of the phase of the polyester [B] appropriately. In order to maintain this characteristic property, preferably the copolymerization ratio $M_f$ of the component (II) and/or the component (III) is at least 40 mole %.

The biaxially oriented polyester film of the present invention has a high elastic modulus, a low thermal shrinkage, and a high impact resistance, in combination. This film is characterized by the two-phase system comprising a dispersed phase and a continuous phase.

One plane of the crystal of the polyester [A] is plane-oriented in the film surface, and the in-plane orientation index is 0.75 to 0.95 and the crystal size in the direction of this crystal plane is 35 to 75 Å.

The dispersed phase and continuous phase referred to herein are defined as follows. When two polymers having a poor compatibility are melt-blended, the two polymers form discrete phases, and an island-sea structure is formed in which the phase of the polymer of a smaller amount is dispersed in the form of islands in the sea of the phase of the polymer of a larger amount. In this case, the portion of the islands is called "the dispersed phase" and the portion of the sea is called "the continuous phase".

In the biaxially oriented polyester film of the present invention, since the polyester [B] is very finely phase-dispersed in the polyester [A], sometimes the phase of the polyester [B] cannot be observed by an ordinary polarizing microscope under crossed prisms while heating the film at a temperature higher than the melting temperature of the polymer. In this case, the interface between the phases can be confirmed, for example, by the method in which the biaxially oriented film is cut in liquefied nitrogen and the cut face is carefully observed at 30,000 magnifications or more by a scanning electron microscope.

If the in-plane orientation index is smaller than 0.75, the impact resistance of the biaxially oriented film is reduced. If the in-plane orientation index exceeds 0.95, the film becomes brittle and a practical necessary impact resistance cannot be obtained.

If the crystal size is smaller than the lower limit value of the above-mentioned range, the thermal stability of the film is reduced and a low thermal shrinkage cannot be obtained. If the crystal size exceeds the upper limit value, the impact resistance is reduced and the film cannot be put to practical use. Namely, in order to attain the object of the present invention, the in-plane orientation index and crystal size of the biaxially oriented film must be controlled within the above-mentioned specific ranges.

Other polymers may be blended in any of the two polyesters [A] and [B] constituting the film of the present invention or a blend thereof in an amount not inhibiting the attainment of the object of the present invention, preferably in an amount smaller than 10% by weight. Furthermore, inorganic and/or organic additives such as an antioxidant, a heat stabilizer, a lubricant, a nucleating agent, and a surface projection-forming agent may be added in customarily adopted amounts if necessary.

The process for the preparation of the film of the present invention will now be described. For the synthesis of the base polyester [A] of the film of the present invention, the following process, for example, can be adopted.

Polyethylene terephthalate (PET) used in the present invention is derived from ethylene glycol and terephthalic acid or derivatives thereof by polymerization according to known procedures. PET having a reducing viscosity of at least 0.5 is used for forming a film having a high strength and a high elastic modulus.

A polyester containing 2,6-naphthalene-dicarboxylic acid is synthesized by subjecting an alkylene glycol (having 2, 4 or 6 carbon atoms) and an ester of 2,6-naphthalenedicarboxylic acid to ester exchange reaction in the presence of a catalyst such as a calcium, magnesium or lithium compound at a temperature of 130° to 260° C., and carrying out polycondensation at a temperature of 220° to 300° C. under a high vacuum in the presence of a catalyst such as an antimony or germanium compound.

A polyester containing structural units of α,β-bis(2-chlorophenoxy)ethane-4,4'-dicarboxylic acid or α-(2-chlorophenoxy)-β-4,4'-dicarboxylic acid is synthesized in the following manner. At first, α,β-bis(2-chlorophenoxy)ethane-4,4'-dicarboxylic acid or an ester derivative thereof is obtained, for example, by nucleus-chlorinating p-hydroxybenzoic acid or an ester derivative thereof with chlorine gas to form 3-chloro-4-hydroxybenzoic acid or a derivative thereof and reacting this compound with an ethylene dihalide in the presence of an alkali compound. Furthermore, α-(2-chlorophenoxy)-β-(phenoxy)ethane-4,4'-dicarboxylic acid or an ester derivative thereof is synthesized, for example, by reacting 3-chloro-4-hydroxybenzoic acid synthesized according to the above-mentioned process and p-hydroxybenzoic acid or ester derivatives thereof with an ethylene halide in the presence of an alkali compound.

The target polymer can be synthesized according to the direct polymerization process in which the above-mentioned two chlorine-containing dicarboxylic acids are subjected to ester-forming reaction with an alkylene glycol (having 2, 4 or 6 carbon atoms) in the presence of a titanium or tin compound and polycondensation is carried out at a temperature of 220° to 300° C. under a high vacuum in the presence of a catalyst such as an antimony or germanium compound, or the ester exchange process in which the above-mentioned chlorine-containing dicarboxylic acid ester derivatives are subjected to ester exchange reaction with an alkylene glycol (having 2, 4 or 6 carbon atoms) at a temperature of 130° to 260° C. in the presence of a catalyst such as calcium, magnesium or lithium compound and polycondensation is carried out at a temperature of 220° to 300° C. under a high vacuum in the presence of an antimony or germanium compound.

Preferably, the melt viscosity of the so-obtained polyester [A] at a shear rate of 200 sec$^{-1}$ is 800 to 15,000 P, especially 1,100 to 8,500 P. Obviously, to obtain a polyester having a melt viscosity within the preferred range, a process may be adopted in which the solid phase polymerization is carried out after completion of the above-mentioned polymerization.

The process for the synthesis of the polyester [B] having a liquid crystal-forming capacity, which is used for the film of the present invention, will now be described.

An acid component is selected from

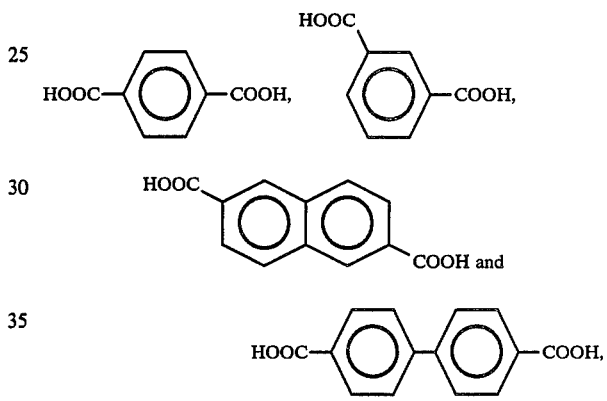

and a dihydroxyl component is selected from

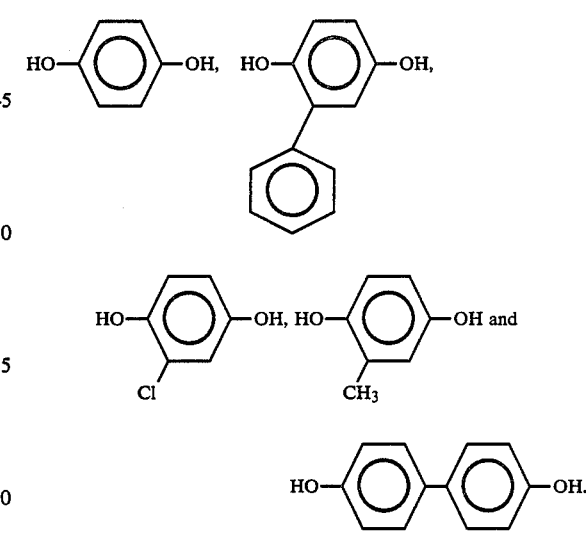

The dihydroxyl component is acetylated, and the acetylated compound is blended with the acid component at a molar ratio of 1/1. The blend is subjected to deacetylation reaction together with the polyester [A] at 250° to 340° C. under a reduced pressure (10$^{-1}$ to 10$^{-2}$ Torr), whereby the polyester [B] having a liquid crystal-forming capacity is synthesized. Furthermore, deacetylation reaction of an acetylation product of a hydroxylcarboxylic acid such as

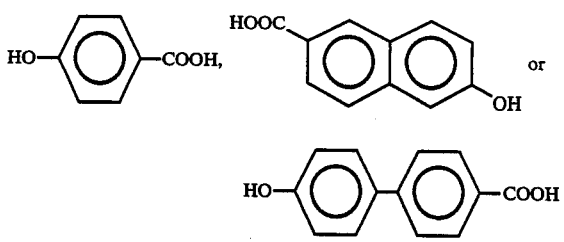

or a composition formed by adding an equimolar mixture of an acetylated dicarboxylic acid and an acetylated dihydroxyl compound to the above acetylation product is carried out at 250° to 340° C. under vacuum in the presence of the polyester [A], and polycondensation is then carried out to form a polymer having a liquid crystal-forming capacity. To ensure that the polyester [B] has a liquid crystal-forming capacity, preferably the mixing ratios of the foregoing various compounds are selected so that the ratio of the component (III) and/or the component (III) is 40 to 90 mole %. According to the kinds of carboxylic acid and hydroxyl compound used, the polymer composition is selected so that the flow-initiating temperature of the polyester [B] is not higher than 350° C.

The polyester [A] and the polyester [B] having a liquid crystal-forming capacity, which have been synthesized according to the above-mentioned processes, are blended by the customary power- or pellet-blending method. The blending ratio is selected so that the content of the component represented by the general formula (II) and/or the component represented by the general formula (III), present in the polyester [B], is 0.5 to 18 mole % based on the polymer blend.

The method for blending the polymers is not particularly critical. However, preferably the polyester [B] is dispersed in the polyester [A] as the main component of the film as finely as possible, and to attain a fine dispersion of the polyester [B], use of a known static mixer or a screw provided with a kneading zone is preferred. If blending is carried out in the molten state for too long, the polymer composition is changed by ester exchange reaction and the expected film properties cannot be obtained.

The two polyesters are supplied to a known melt extruder after blending or while they are being blended. The polymers supplied to the melt extruder are molten at 270° to 350° C., and the melt is extruded in the form of a sheet through a slit die and cooled and solidified by winding the sheet around a casting drum controlled to a surface temperature of 10° to 80° C. to form an undrawn film. In order to cool the sheet rapidly and uniformly, the electrostatic casting method is adopted. The polymer blend containing the polyester having a liquid crystal-forming capacity is wound on the casting drum at a draft ratio of 3 to 30.

The polymer blend has a structure in which the polyester [B] having a liquid crystal-forming capacity is dispersed heterogeneously in the matrix of the polyester [A] as the main component. In this case, if the shape of the dispersed phase is that of a rod or wire having an axial ratio larger than that of the sphere, the characteristics of the film of the present invention are especially excellent. Accordingly, the melt extruded from the melt extruder is cooled and solidified on the casting drum while elongating the melt to draw the dispersed phase, and preferably, the melt is wound at a draft ratio of 3 to 30.

Then, the so-obtained undrawn film is biaxially drawn. The known simultaneous biaxial drawing method and sequential biaxial drawing method can be adopted as the biaxial drawing method. In the sequential biaxial drawing method, in general, the film is first drawn in the longitudinal direction and then drawn in the lateral direction. This drawing order may be reversed. The biaxial drawing conditions differ according to the properties of the polyesters constituting the film to be drawn, the blending ratio, the drawing direction and the like, but preferably the film is drawn at a temperature higher by 5° to 50° C. than the glass transition temperature of the main polyester constituting the continuous phase of the film at a drawing speed of $10^3$ to $10^5$%/min, and further preferably, the draw ratio $\alpha$ in the longitudinal direction of the film and the draw ratio $\beta$ in the lateral direction of the film satisfies the requirement of $12.5 \leq \alpha^2 + \beta^2 \leq 55.0$ ($\alpha > 2$ and $\beta > 2$).

The film drawn at the above-mentioned draw ratio is preferable for attaining the in-plane index and crystal size of the film specified in the present invention.

The method in which the biaxially drawn film is drawn in at least one direction again is effective for increasing the elastic modulus.

The drawn film is then heat-treated. The heat treatment is carried out on an oven or roll according to known procedures. The heat treatment conditions for obtaining the film of the present invention differ according to the kind of the polyester [A], but generally, the heat treatment is preferably carried out at 180° to 240° C. for 0.1 to 120 seconds.

The film of the present invention may be subjected to a known corona discharge treatment (in air, in nitrogen or in carbon dioxide gas). In order to impact adhesiveness, moisture resistance, heat sealability, lubricating property, and surface smoothness, the film may be used in the form of a laminate with another polymer or when covered with an organic and/or inorganic composition.

The copolyester having a liquid crystal-forming capacity in the film of the present invention is characterized in that the soft chain component is copolymerized with the rigid component, and the copolyester is characteristic over a polyester composed solely of the rigid component in that the flow-initiating temperature is low, the film-forming property is good, and the copolyester is finely dispersed in a polyester composed of the soft component. More specifically, at the step of forming the film of the present invention, little peeling of the layer or a formation of voids occurs in the dispersion interface, drawing of the film can be easily accomplished, the obtained biaxially oriented film has a high elastic modulus and an excellent dimensional substability, and the biaxially oriented film is relatively transparent and has an excellent impact resistance.

The dispersed phase formed by the polyester having a liquid crystal-forming capacity provides very roughened film surface to impart an easy slip characteristic to the film. Namely, the size of the dispersed phase, that is, the size of the convexities and concavities on the film surface, can be controlled by changing the chemical structure of the polyester. Accordingly, fine convexities and concavities that cannot be formed by a conventional inorganic particulate lubricant can be formed on the surface, and a very slippery surface state can be realized.

Furthermore, since the rigid ester linkage of the polyester having a liquid crystal-forming capacity is subjected to little ester-exchange with the ester linkage of the soft component, the film can be regenerated and used again.

The film of the present invention has a high elastic modulus and an excellent dimensional stability in combination, and therefore, if the film of the present invention is formed into a magnetic tape, excellent electric-magnetic conversion characteristics can be obtained. Moreover, the film of the present invention is valuable as a flexible printed circuit substrate.

The film of the present invention can be applied to all uses to which the conventional biaxially oriented polyester films have been applied, but the film of the present invention is especially suitably for use as a base film of a magnetic tape used for a video or audio device, a base film for a magnetic disc, and a flexible printed circuit substrate. The thickness of the film of the present invention is not particularly cirtical, but a film having a thickness of 1 to 15 μm, especially 4 to 12 μm, is preferably for a magnetic tape that can be used for a long time, and a film having a thickness of 50 to 150 μm is preferable for a flexible printed circuit board.

The characteristics referred to in the present invention are determined and evaluated according to methods and standards described below.

(1) Flow-Initiating Temperature

The temperature at which the needle penetration thickness is at least 90% of the thickness of the sample is measured according to the penetration method using a thermal mechanical testing apparatus (TMA) supplied by Shinku Riko K.K., and this temperature is designated as the flow-initiating temperature. At the penetration test, a columnar quartz glass rod having a diameter of 1 mm is positioned vertically erect on the polymer sheet and the temperature is elevated at a rate of 20° C./min while imposing a load of 1 g on the glass rod.

(2) Elastic Modulus and Specific Elastic Modulus

According to the method specified in JIS Z-1702, the elastic modulus is measured at a temperature of 25° C. and a relative humidity of 65% by using an Instron type tensile tester. The elastic modulus of a biaxially oriented film is an arithmetic mean of the elastic modulus in the longitudinal direction of the film and the elastic modulus in the lateral direction of the film. The specific elastic modulus of the blend film is defined by $E/E_0$ in which $E_0$ and $E$ represent the elastic moduli of the PET film and blend film formed under the same conditions.

(3) Impact Resistance

According to the method specified in ASTM D-256, the Charpy impact strength (unit: kg·cm/mm$^2$) of the film is measured by a Charpy impact tester supplied by Toyo Seiki Seisakusho. An arithmetic mean value of the value obtained when the film is set horizontally between two fulcra in the longitudinal direction of the film and the value obtained when the film is set horizontally in the lateral direction of the film is adopted. When the Charpy impact strength is 20 or higher, it is judged that the impact resistance is good, and when the impact strength is lower than 20, it is judged that the impact resistance is poor.

(4) Dimensional Stability (Thermal Shrinkage)

The sample film is cut into a specimen having a width of 10 mm and a length of 250 mm, and two mark lines are drawn with a distance of about 200 mm. This distance (A mm) is precisely measured. A load of 3.0 g is imposed on the top end of the specimen, and in this state, the specimen is allowed to stand in a hot air oven at 180° C. for 10 minutes and the specimen is then cooled to room temperature. The distance (B mm) between the mark lines is measured. The value of $100 \times (A-B)/A$ is calculated for each of the longitudinal direction and lateral direction of the film. The arithmetic mean value is designated as the thermal shrinkage of the film.

(5) Dimensional Stability Coefficient

The dimensional stability is defined by the formula of $\delta/(E-400)$ in which E stands for the elastic modulus of the film and $\delta$ stands for the thermal shrinkage of the film. When this value is smaller than $25 \times 10^{-3}$, it is judged that the balance between the Young's modulus and thermal shrinkage is good, and when the value is $25 \times 10^{-3}$ or larger, it is judged that this balance is not good.

(6) In-Plane Orientation Index

Strips (0.8 mm × 10 mm) are cut out from the sample film so that the long sides are in agreement with the lateral direction of the film. The surfaces of these strips are piled together and the strips are combined to form an X-ray diffraction sample having a thickness of 5 mm. The sample is set so that the longitudinal direction of the film is in agreement with the direction of the X-rays. Then, the sample is tilted by about 13° around the lateral direction of the film and X-rays are made incident to obtain a diffraction peak. The incidence angle is minutely adjusted so that the incidence direction is in agreement with the diffraction peak. While the sample is rotated around the longitudinal direction of the film, the change of the diffraction intensity is observed. Supposing that the half-value width in the peak curve showing the relationship between the rotation angle of the sample and the diffraction intensity is $\Delta$, the in-plane orientation index is given by the following formula:

$$\text{in-plane orientation index} = \frac{180 - \Delta}{180} \times 100$$

(7) Crystal Size

By using an X-ray diffraction apparatus, the diffraction peak is observed by the reflection method while changing the lateral direction of the film and the incidence angle of X-rays. From the diffraction peak at about 13°, the crystal size D (Å) in the diffraction crystal plane direction of this peak is calculated according to the following equation:

$$D = \frac{\lambda}{(B - b)\cos\theta}$$

wherein B stands for the half-value width of the diffraction peak, b is 0.12°, $\lambda$ stands for the wavelength of the $K_\alpha$ ray (1.5418 Å) of Cu, and $\theta$ stands for the diffraction angle of the peak.

Embodiments of the present invention will now be described with reference to the following examples.

EXAMPLE 1

A pellet of PET (reducing viscosity: 0.66) prepared by polymerization according to customary procedures was pulverized by a pulverizer to obtain a pulverization product.

Separately, 624 parts by weight of pulverized PET was mixed with 1,260 parts by weight of p-acetoxybenzoic acid and polymerization was carried out according to the deacetylation polymerization process [disclosed in J. Polymer Sci., 14, 2043 (1976)] to obtain an ethylene terephthalate/p-hydroxybenzoate copolymer (containing 70 mole % of p-hydroxybenzoate). The polymer was pulverized by the pulverizer as PET. When the polymer was observed under crossed prisms at about 310° C. by a polarizing microscope provided with a heater, it was found that the polymer had an optical anisotropy. The flow-initiating temperature of the polymer was lower than 350° C.

The pulverization products of PET and the ethylene terephthalate/p-hydroxybenzoate copolymer were charged in a V-type blender so that the amount added of the latter was 7% by weight (the molar ratio of the rigid component was 3.3 mole %), and the mixture was blended for about 1 hour. The resulting blend and the pulverization product of PET as a comparison were dried, independently supplied to an extruder having a screw diameter of 35 mm, and melt-extruded in the form of a sheet at 290° C. Each sheet was wound on a casting drum having a surface temperature of 20° C. at a winding speed corresponding to a draft ratio of 6 and cooled and solidified according to the electrostatic casting method for forming a substantially unoriented undrawn film having a thickness of about 100 μm. The undrawn film was pre-heated at 80° C. and drawn in the longitudinal direction at a drawing temperature of 90° C. and a draw ratio of 3.0. Drawing was effected by the difference of the peripheral speed between two sets of rolls. The drawing speed was 50,000%/min. The monoaxially drawn film was pre-treated at 90° C. and drawn in the lateral direction at a drawing temperature of 95° C. and a draw ratio of 3.2 by a tenter. The drawing speed was 5,000%/min. The biaxially drawn film was heat-treated at 210° C. under a constant length for 15 seconds to obtain a film having a thickness of about 11 μm. The specific elastic modulus of the film was good and 1.2, and the dimensional stability coefficient and impact resistance were good. The in-plane orientation index was 0.89 and the crystal size was 52 Å.

The biaxially drawn film was cut into small pieces by a crusher, and the small pieces were compressed for form a pellet. The pellet was supplied to an extruder and a biaxially drawn film was prepared again under the same conditions as described above. The characteristics and structure of the film were not different from those of the originally prepared film.

EXAMPLES 2 THROUGH 4 AND COMPARATIVE EXAMPLES 1 AND 2

The ethylene terephthalate/p-hydroxybenzoate copolymer was blended in an amount of 5% by weight in Example 2, 10% by weight in Example 3 or 20% by weight in Example 4 into PET. Films were prepared under the following conditions.

First, a substantially unoriented undrawn film having a thickness of about 110 μm, which was prepared in the same manner as described in Example 1, was simultaneously biaxially drawn at 85° C. and a draw ratio of 3.5 in each of the longitudinal and lateral directions by using a film stretcher (supplied by T.M. Long Co.). The drawing speed was 20,000%/sec. The biaxially drawn film was heat-treated at 210° C. under a constant length for 15 seconds to obtain a film having a thickness of about 10 μm. The physical properties of the so-prepared films are shown in Table 1. It is seen that each film had a good elastic modulus and an excellent dimensional stability coefficient and impact resistance. However, in Comparative Examples 1 and 2, in which the polymer having a melt anisotropy-forming capacity was blended in an amount of 0.5% by weight or 40% by weight into PET, the molar ratio of the rigid component was outside the range specified in the present invention, and as shown in Table 1, the film was poor in one or more of the elastic modulus, dimensional stability coefficient, and impact strength. In Comparative Example 2, drawing could not be performed at the above-mentioned draw ratio. Accordingly, drawing was carried out by changing each of the draw ratios in the longitudinal and lateral directions of the film to 1.5.

EXAMPLES 5 AND 6 AND COMPARATIVE EXAMPLES 3 AND 4

Ethylene terephthalate/p-hydroxybenzoate copolymers having the compositions shown in Examples 5 and 6 and Comparative Examples 3 and 4 of Table 1 were synthesized in the same manner as described in Example 1 except that the mixing ratio between PET and p-acetoxybenzoic acid was changed as shown in Table 1. Only the polymer of Comparative Example 3 had no melt anisotropy-forming capacity. Each polymer had a flow temperature lower than 350° C.

The copolyester was blended in PET in an amount of 10% by weight in Example 5, 10% by weight in Example 6, 40% by weight in Comparative Example 3 or 60% by weight in Comparative Example 4, and biaxially drawn films were prepared in the same manner as in Examples 2 and 3. The physical properties of these films are shown in Table 1. It is seen that, if the composition of the copolyester and a melt anisotropy-forming capacity and the molar ratio of the rigid component was within the range specified in the present invention, the characteristics of the film were good. In contrast, even if the molar ratio of the rigid component was within the range specified in the present invention, where the copolyester had no melt anisotropy-forming capacity, the elastic modulus and impact resistance were poor. Note, in Comparative Examples 3 and 4, drawing at the above-mentioned draw ratio was impossible and, therefore, the draw ratio in each of the longitudinal and lateral directions of the film was changed to 2.0.

COMPARATIVE EXAMPLE 5

The undrawn film obtained in Example 1 was drawn at a draw ratio of 4.0 in the longitudinal direction at 85° C. while keeping the width constant by using a film stretcher. The drawing speed was 5,000%/min. The width-fixed, monoaxially drawn film was heat-treated at 210° C. under a constant length for 15 seconds. The obtained film had an in-plane orientation index of 0.59 and a crystal size of 50 Å, and the impact resistance was poor.

COMPARATIVE EXAMPLE 6

The biaxially drawn film obtained in Example 1 was heat-treated at 235° C. under a constant length of 100 hours. The obtained film had an in-plane orientation index of 0.97 and a crystal size of 70 Å. The dimensional stability coefficient was good but the impact resistance was poor.

EXAMPLE 7 AND COMPARATIVE EXAMPLES 7 AND 8

A mixture of 624 parts by weight of pulverized PET physical properties of these films are shown in Table 1. It is seen that, if the molar ratio of the rigid component was within the range specified in the present invention, the physical properties were good, but if the molar ratio of the rigid component was outside the range specified in the present invention, the dimensional stability coefficient or the impact resistance was poor.

TABLE 1

| | Composition of copolyester* | | Molar ratio of rigid component (mole %) | In-plane orientation index | Crystal size (Å) | Specific elastic modulus | Dimensional stability coefficient | | Impact resistance (evaluation) | Remarks |
|---|---|---|---|---|---|---|---|---|---|---|
| | Structural units | Construction ratio (molar ratio) | | | | | Value | Evaluation | | |
| Example 2 | P/Q | P/Q = 30/70 | 2.4 | 0.89 | 53 | 1.2 | $13 \times 10^{-3}$ | Good | Good | Present invention |
| Example 3 | P/Q | P/Q = 30/70 | 4.8 | 0.89 | 47 | 1.25 | $8 \times 10^{-3}$ | Good | Good | Present invention |
| Example 4 | P/Q | P/Q = 30/70 | 9.7 | 0.89 | 51 | 1.25 | $5 \times 10^{-3}$ | Good | Good | Present invention |
| Comparative Example 1 | P/Q | P/Q = 30/70 | 0.024 | 0.90 | 53 | 1.0 | $53 \times 10^{-3}$ | Poor | Good | Outside present invention |
| Comparative Example 2 | P/Q | P/Q = 30/70 | 19.9 | 0.72 | 58 | 0.4 | — | — | Poor | Outside present invention |
| Example 5 | P/Q | P/Q = 20/80 | 5.7 | 0.87 | 55 | 1.2 | $12 \times 10^{-3}$ | Good | Good | Present invention |
| Example 6 | P/Q | P/Q = 40/60 | 3.9 | 0.89 | 53 | 1.15 | $15 \times 10^{-3}$ | Good | Good | Present invention |
| Comparative Example 3 | P/Q | P/Q = 80/20 | 4.4 | — | — | 0.7 | — | — | Poor | Outside present invention |
| Comparative Example 4 | P/Q | P/Q = 40/60 | 24.7 | — | — | 0.6 | — | — | Poor | Outside present invention |
| Example 7 | P/R | P/R = 30/70 | 1.9 | 0.85 | 53 | 1.2 | $11 \times 10^{-3}$ | Good | Good | Present invention |
| Comparative Example 7 | P/R | P/R = 30/70 | 0.19 | 0.90 | 54 | 1.1 | $47 \times 10^{-3}$ | Good | Good | Outside present invention |
| Comparative Example 8 | P/R | P/R = 30/70 | 17.3 | — | — | — | — | — | Poor | Outside present invention |

Note

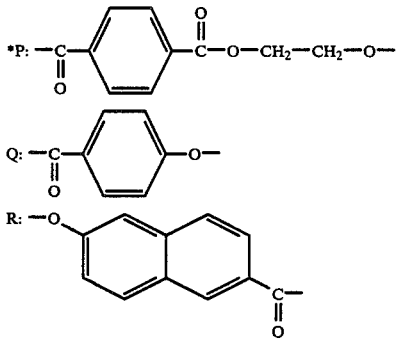

and 1,316 parts by weight of β-hydroxy-6-naphthoic acid was subjected to deacetylation polymerization under the same conditions as described in Example 1 to form a copolyester having a melt anisotropy-forming capacity. The flow temperature of the polymer was lower than 350° C.

The copolyester was blended with PET in an amount of 5% by weight in Example 7, 0.5% by weight in Comparative Example 7 or 40% by weight in Comparative Example 8. Undrawn films were prepared in the same manner as described in Example 1. Simultaneous biaxial drawing and heat treatment were carried out in the same manner as in Examples 2 through 4 to obtain biaxially drawn films. Note, in Comparative Example 8, drawing could not be performed, and therefore, the properties of the undrawn film were evaluated. The

EXAMPLE 8

A reaction vessel equipped with a rectifying column was charged with 85 parts by weight (hereinafter referred to as "parts") of dimethyl α,β-bis(2-chlorophenoxy)ethane-4,4'-dicarboxylate, 13.7 parts of dimethyl α-(2-chlorophenoxy)-β-(phenoxy)ethane-4,4-dicarboxylate (molar ratio: 85/15), 29.5 parts of ethylene glycol (ethylene glycol/total dimethyl dicarboxylate molar ratio: 1.9/1), 0.075 part of calcium acetate, and 0.04 part of antimony trioxide, and the temperature was gradually elevated with stirring over a period of 4 hours to a reaction temperature of 140° to 245° C. to distill methanol in an amount of 99% (15.9 parts) based on the theoretical amount. Then, 0.02 part of trimethyl phosphate was added to the reaction mixture and the ester exchange reaction product was transferred to a polymerization vessel. The temperature was elevated to 245° to 290° C. over a period of 1 hour and, simultaneously, the pressure was reduced to a high vacuum of less than 0.5 Torr over a period of 1 hour. The polycondensation was further conducted for 2 hours. The pressure was returned to atmospheric pressure by nitrogen, and the polymer was extruded in the form of a gut into water under compression and the gut was cut to obtain a pellet. The pellet was pulverized to obtain a pulverization product of a copolyester having a melt viscosity of 1,900 poise (hereinafter referred to as "polymer I").

An ethylene terephthalate/p-hydroxybenzoate copolymer having a liquid crystal-forming capacity (containing 70 mole % of p-hydroxybenzoate) (hereinafter referred to as "polymer II") was prepared by carrying out the polymerization in the same manner as described in Example 1.

The polymer pellet was pulverized by a pulverizer to obtain a pulverization product. When the polymer II was heated at about 290° C. and observed under crossed prisms by a polarizing microscope equipped with a heater, it was found that the polymer II had an optical anisotropy. The flow temperature was within the range specified in the present invention.

The pulverization products of the polymers I and II were charged in a V-type blender so that the molar ratio of the rigid component was about 4 mole %, and were blended for about 1 hour (the blending ratio of the polymer II was 5% by weight). The pulverization product blend and the pulverization product of the polymer I as a comparison were dried and were separately melt-extruded in the form of a sheet at 290° C. through an extruder having a screw diameter of 35 mm. According to the electrostatic casting method, the melt sheet was wound on a casting drum having a surface temperature of 20° C. at a draft ratio of 6 and cooled and solidified to obtain a substantially unoriented undrawn film having a thickness of about 110 μm. The undrawn film was preheated at 100° C. and drawn at a drawing temperature of 120° C. and a draw ratio of 3.2 in the longitudinal direction. Drawing was effected by the difference of the peripheral speed between two sets of rolls, and the drawing speed was 50,000%/min. The monoaxially drawn film was pre-heated at 110° C. and drawn at a drawing temperature of 120° C. and a draw ratio of 3.4 in the lateral direction by using a tester. The drawing speed was 5,000%/min. The biaxially drawn film was heat-treated at 230° C. under a constant length for 15 seconds to obtain a film having a thickness of 10 μm. The so-obtained film of the polymer I had an elastic modulus of 620 kg/mm$^2$ and a thermal shrinkage of 4.4%. In contrast, the blend reinforced film had an elastic modulus of 700 kg/mm$^2$ and a thermal shrinkage of 1.0% and the film was proved to be excellent. Moreover, the impact resistance was good, and the blend film had an in-plane orientation index of 0.93 and a crystal size of 6.1 Å.

EXAMPLE 9 AND COMPARATIVE EXAMPLES 9 AND 10

The polymers I and II obtained in Example 8 were blended so that the blending ratio of the polymer II was 10% by weight in Example 9, 0.5% by weight in Comparative Example 9 or 30% by weight in Comparative Example 10, and biaxially drawn films were obtained in the same manner as described in Example 8. The physical properties of the obtained films are shown in Table 2. It is seen that, if the molar ratio of the rigid component was within the range specified in the present invention, the elastic modulus was high, the thermal shrinkage was low, and the impact resistance was good. If the molar ratio of the rigid component was outside the range specified in the present invention, although the elastic modulus was low, the thermal shrinkage was relatively high or the impact resistance was poor. Note, in Comparative Example 10, drawing could not be performed under the conditions described in Example 8, and therefore, the film was prepared by changing the draw ratio in the longitudinal direction to 1.5 and the draw ratio in the lateral direction to 1.4.

EXAMPLE 10 AND COMPARATIVE EXAMPLES 11 AND 12

A copolymer of polyphenylhydroquinone terephthalate and polyethylene terephthalate (hereinafter referred to as "polymer III") was prepared by carrying out deacetylation polymerization of acetylated phenylhydroquinone and terephthalic acid in the presence of polyethylene terephthalate (according to the process disclosed in U.S. Pat. No. 4,159,365). The amount added of polyethylene terephthalate was adjusted so that the copolymerization ratio of the ethylene terephthalate units was 5 mole %. The obtained polymer pellet was pulverized by a pulverizer. When the polymer was heated at about 300° C. and observed under crossed prisms by a polarizing microscope, the polymer showed an optical anisotropy. The flow temperature of the polymer was within the range specified in the present invention.

The pulverization products of the polymer I obtained in Example 8 and the polymer III were blended so that the blending ratio of the polymer III was 5% by weight in Example 10, 0.5% by weight in Comparative Example 11 or 25% by weight in Comparative Example 12, and biaxially drawn films were prepared under the same conditions are described in Example 8. The physical properties of the obtained films are shown in Table 1. It is seen that, if the molar ratio of the rigid component was within the range specified in the present invention, the elastic modulus was high, the thermal shrinkage was low, and the impact resistance was good. In contrast, if the molar ratio of the rigid component was outside the range of the present invention, the reinforcing effect by blending was not attained, drawing of the film was impossible (Comparative Example 12) or the impact resistance was poor.

COMPARATIVE EXAMPLE 13

The undrawn film obtained in Example 8 was drawn at 120° C. and a draw ratio of 4.0 in the longitudinal direction while fixing the width of the film by using a film stretcher (supplied by T.M. Long Co.). The drawing speed was 5,000%/min. The width-fixed, monoaxially drawn film was heat-treated at 230° C. under a constant length for 15 seconds. The in-plane orientation index of the obtained film was 0.60 and the crystal size was 60 Å. The impact resistance was poor.

COMPARATIVE EXAMPLE 14

The biaxially drawn film obtained in Example 10 was heat-treated at 240° C. under a constant length for 100 hours. The in-plane orientation index of the obtained film was 0.97 and the crystal size was 79 Å. The plastic modulus and dimensional stability of the film were good, but the film was brittle and the impact resistance was poor.

EXAMPLE 11 AND COMPARATIVE EXAMPLES 15 AND 16

A blend of 244 parts of methyl 2,6-naphthalenedicarboxylate and 62 parts of ethylene glycol was polycondensed under the same conditions as described in Example 8 to obtain poly(ethylene 2,6-naphthalate) (hereinafter referred to as "polymer IV"). The polymer IV was mixed with the polymer III obtained in Example 3 so that the amount of the polymer III was 5% by weight in Example 11, 0.5% by weight in Comparative Example 15 or 25% by weight in Comparative Example 16. A substantially unoriented undrawn film having a thickness of about 120 μm was prepared in the same manner as described in Example 8. The film was simultaneously biaxially drawn at 145° C. and a draw ratio of 3.3 by using a film stretcher (supplied by T.M. Long Co.). The drawing speed was 10,000%/min. The simultaneously biaxially drawn film was heat-treated at 230° C. under a constant length for 15 seconds to obtain a film having a thickness of about 10 μm. The physical properties of the so-obtained films are shown in Table 2. It is seen that if the molar ratio of the rigid component was within the range specified in the present invention, the elastic modulus was high, the thermal shrinkage was low, and the impact resistance was good. The film of the polymer IV alone prepared as a comparison had an elastic modulus of 590 kg/mm$^2$ and a thermal shrinkage of 20%.

In contrast, if the molar ratio of the rigid component was outside the range specified in the present invention, drawing was impossible (Comparative Example 16) or the reinforcing effect by blending was not substantially manifested.

TABLE 2

| | Polymer having liquid crystal-forming capacity | | Molar ratio of rigid component (mole %) | Elastic modulus (kg/mm$^2$) | Thermal shrinkage (%) | Impact resistance (evaluation) | In-plane orientation index | Crystal size (Å) | Remarks |
|---|---|---|---|---|---|---|---|---|---|
| | Structural units | Construction ratio (molar ratio) | | | | | | | |
| Example 9 | P/Q | P/Q = 30/70 | 7.5 | 744 | 0.5 | Good | 0.90 | 66 | Present invention |
| Comparative Example 9 | P/Q | P/Q = 30/70 | 0.39 | 610 | 4.1 | Good | 0.93 | 67 | Outside present invention |
| Comparative Example 10 | P/Q | P/Q = 30/70 | 20.7 | 300 | 0.3 | Poor | 0.80 | 70 | Outside present invention |
| Example 10 | P/R | P/R = 5/95 | 5.8 | 700 | 0.7 | Good | 0.90 | 64 | Present invention |
| Comparative Example 11 | P/R | P/R = 5/95 | 0.31 | 620 | 4.0 | Good | 0.90 | 69 | Outside present invention |
| Comparative Example 12 | P/R | P/R = 5/95 | 27.5 | — | — | Poor | — | — | Outside present invention |
| Example 11 | P/R | P/R = 5/95 | 3.7 | 640 | 0.5 | Good | 0.92 | 60 | Present invention |
| Comparative Example 15 | P/R | P/R = 5/95 | 0.37 | 550 | 1.8 | Good | 0.94 | 63 | Outside present invention |
| Comparative Example 16 | P/R | P/R = 5/95 | 19.3 | — | — | Poor | — | — | Outside present invention |

Note

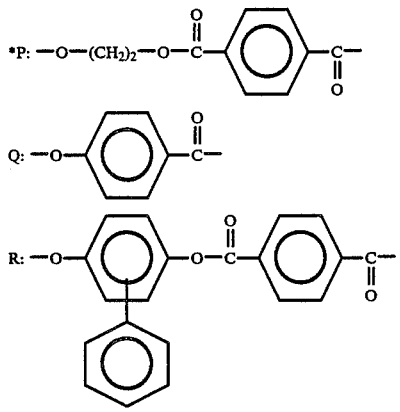

CAPABILITY OF EXPLOITATION IN INDUSTRY

The biaxially oriented polyester film of the present invention has a high elastic modulus, a low thermal shrinkage and an excellent dimensional stability. Accordingly, this film is valuable for the production of, for example, a magnetic tape and a flexible printed circuit substrate.

We claim:

1. A biaxially oriented polyester film composed mainly of a polymer blend comprising [A] a polyester having recurring units of the following general formula (I);

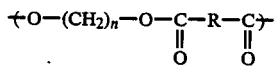 (I)

wherein n is 2, 4 or 6 and R is at least one member selected from the group consisting of

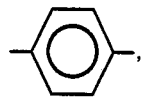,

 and

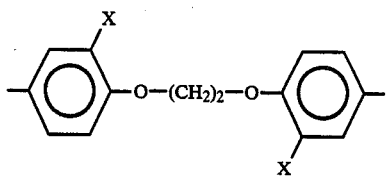

in which X is H or Cl and at least one X is Cl, and [B] a copolyester having units represented by the general formula (I) and units represented by the following general formula (II) and/or the following general formula (III):

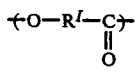 (II)

and/or

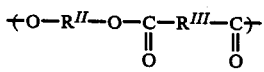 (III)

wherein $R^I$, $R^{II}$ and $R^{III}$ stand for at least one member selected from the group consisting of 1,3-phenylene, 1,4-phenylene, 2,6-naphthalene, 2,7-naphthalene,

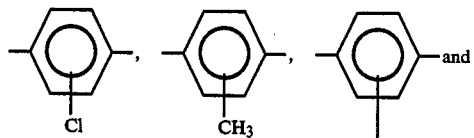 and

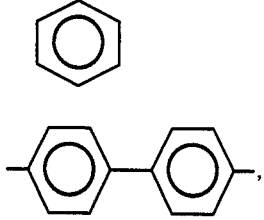

and having a flow-initiating temperature not higher than 350° C. and a melt anisotropy-forming capacity, the molar ratio of the units represented by the general formula (II) and/or the general formula (III) being 0.5 to 18 mole % based on the total polyblend, wherein one plane of the crystal of the polyester [A] is plane-oriented in the film surface, the in-plane orientation index is 0.75 to 0.95, and the crystal size in said crystal plate direction is 35 to 75 Å.

2. A polyester film as set forth in claim 1, wherein the molar ratio of the units represented by the general formulae (II) and (III) is 1 to 15 mole % based on the total polymer blend.

3. A polyester film as set forth in claim 1, wherein the molar ratio of the recurring units represented by the general formulae (II) and (III) is 2 to 10 mole % based on the total polymer blend.

4. A polyester film as set forth in claim 1, wherein in the recurring units constituting the polyester [A], which are represented by the general formula (I), n is 2.

5. A polyester film as set forth in claim 1, wherein the recurring units constituting the polyester [A], which are represented by the general formula (I), are represented by the following formula:

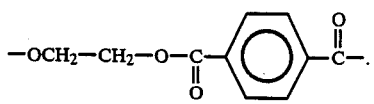

6. A polyester film as set forth in claim 1, wherein the recurring units constituting the polyester [A], which are represented by the general formula (I), are represented by the following formula:

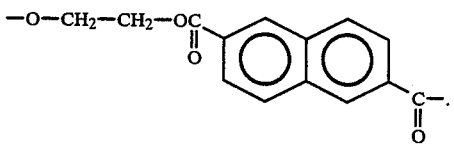

7. A polyester film as set forth in claim 1, wherein the recurring units constituting the polyester [A], which are represented by the general formula (I), are represented by the following formula:

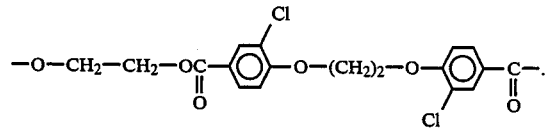

8. A polyester film as set forth in claim 1, wherein in the recurring units constituting the polyester [B], which are represented by the general formulae (II) and (III), at least one of $R^I$, $R^{II}$ and $R^{III}$ is selected from the group consisting of

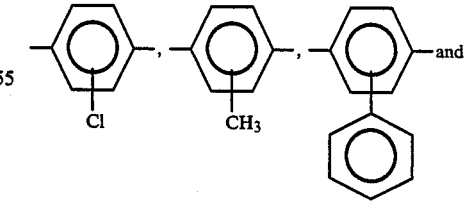 and

.

9. A polyester film as set forth in claim 1, wherein the flow-initiating temperature of the polyester B is 150° to 300° C.

10. A polyester film as set forth in claim 1, wherein the sum of the molar ratios r and q of the components represented by the general formulae (II) and (III) in the polyester [B] is at least 40 mole %.

11. A polyester film as set forth in claim 1, wherein the proportion $X_b$ (% by weight) of the polyester [B] in the blend of the polyester [A] and the polyester [B] satisfies the requirement represented by the following formula:

$$1 \leq X_b \leq -0.8 M_f + 90$$

wherein Mf stands for the copolymerization ratio (mole %) of the components represented by the general formulae (II) and (III) in the polyester [B].

* * * * *

UNITED STATES PATENT AND TRADEMARK OFFICE
CERTIFICATE OF CORRECTION

PATENT NO. : 4,798,875
DATED : Jan. 17, 1989
INVENTOR(S) : Kuniyoshi Itoyama, et al It is certified that error appears in the above-identified patent and that said Letters Patent is hereby corrected as shown below:

Table 1, line 30, column 20 (last entry of good in column 20), change "good" under "evaluation" to --poor--.

Signed and Sealed this

Twenty-fourth Day of April, 1990

Attest:

HARRY F. MANBECK, JR.

*Attesting Officer*     *Commissioner of Patents and Trademarks*